Dec. 26, 1950  S. P. BECKER  2,535,623
WIRE GRIPPING ASSEMBLY AND CASING CONNECTOR
Filed May 10, 1947
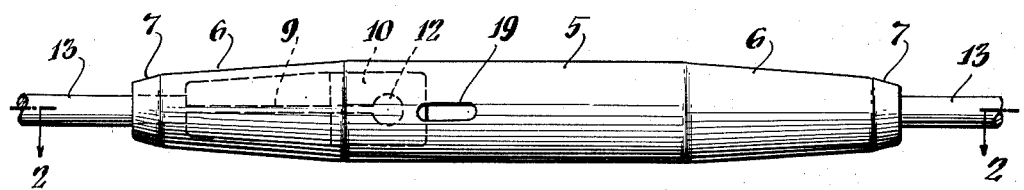
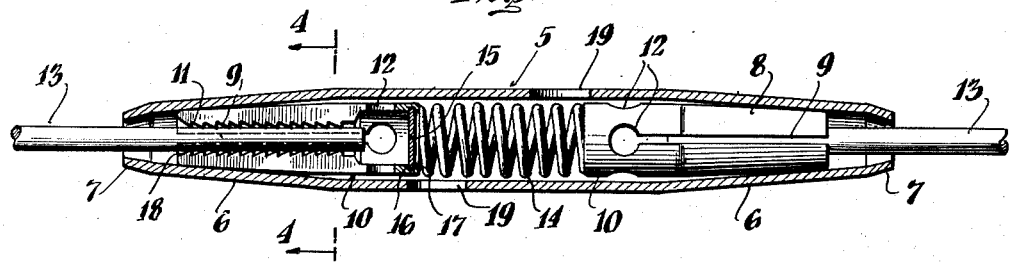
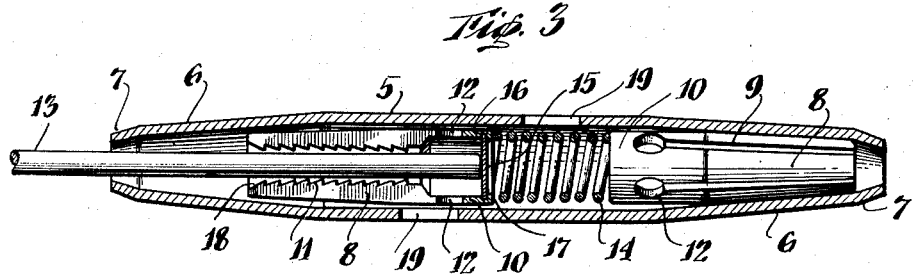
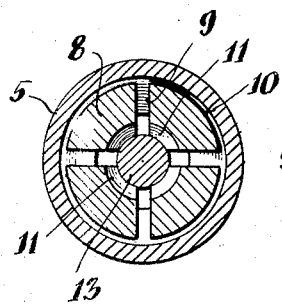
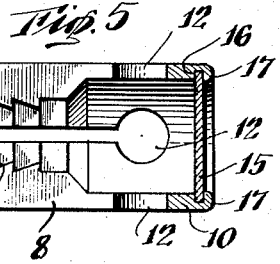
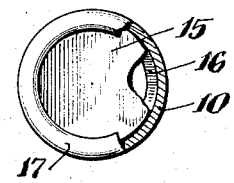
INVENTOR.
Stephen P. Becker
BY
Duell and Kane
ATTORNEYS

Patented Dec. 26, 1950

2,535,623

UNITED STATES PATENT OFFICE 2,535,623

WIRE GRIPPING ASSEMBLY AND CASING CONNECTOR

Stephen P. Becker, Poughkeepsie, N. Y., assignor to Fargo Mfg. Company, Inc., Poughkeepsie, N. Y., a corporation of New York Application May 10, 1947, Serial No. 747,250

2 Claims. (Cl. 24—81)

1

This invention relates to a structurally and functionally improved electrical connector and in its more specific aspects aims to provide a unit of this type for connecting or splicing and supporting the ends of cables or wires.

It is an object of the invention to provide a device of this class which among other advantages, will be capable of being readily manipulated to efficiently cooperate with and grip the ends of cables and wires and the design of which will be such that the wires to be connected will be properly disposed with respect to the same to efficiently transmit electrical current. Moreover, by means of the structure incorporated in the present improved unit, no skilled technique will be necessary to establish a proper relationship between the connector and the wire or cable. Also, when once so established, the parts will remain immovable with respect to each other except under deliberate manipulation to assure their separation.

An additional object is that of furnishing a unit of this type and in which a positive stop structure will be provided, so that the cable ends may not be improperly disposed with respect to the parts of the connector with the consequent danger of such parts failing to operate or else operating in an improper manner.

Still another object is that of designing a connector in which the gripping elements will be strengthened in an extremely efficient manner so there will be substantially no danger of failure of the parts.

A further object is that of providing a unit which will embody relatively few parts each of simple and rugged construction, such parts being capable of economical manufacture and assemblage by relatively unskilled labor to furnish a unitary article operating over long periods of time with freedom from all difficulties.

With these and other objects in mind, reference is had to the attached sheet of drawings illustrating one practical embodiment of the invention and in which:

Fig. 1 is a side elevation of a connector coupling the ends of sections of a wire or cable;

Fig. 2 is a sectional side view taken along the lines 2—2 and in the direction of the arrows as shown in Fig. 1;

Fig. 3 is a view similar to Fig. 2 but illustrating the positions which the parts assume with one of the wire or cable sections uncoupled and the other in process of association therewith;

Fig. 4 is a transverse sectional view taken along lines 4—4 and in the direction of the arrows as indicated in Fig. 2;

Fig. 5 is a fragmentary sectional view of the rear portion of the gripping assembly; and Fig. 6 is an end view of that assembly, with certain parts broken away to disclose underlying construction.

A connector such as this is usually identified as a "line splice" among those skilled in the art. As illustrated, it includes a body 5 in the form of a tube having outwardly tapered ends 6 which, conveniently adjacent their outer edges as at 7, are tapered to a relatively acute degree. This body may be formed of any suitable material such as bronze or any other non-ferrous metal capable of efficiently transmitting electrical current. Likewise, it is preferred that the parts hereinafter described, be formed of metals of similar type.

As shown especially in Fig. 2 there is disposed within the body 5 a pair of gripping elements in the nature of chucks. These elements each include jaw portions 8 separated by slots 9 and having a common base portion 10. Each of the jaws may be machined or otherwise treated to present in its inner surfaces serrations or gripping teeth 11. The base portions 10 may be formed with openings 12, defining the inner ends of slots 9. The surface of the side walls forming the base portion is otherwise uninterrupted. In this manner, an extremely resilient mounting is furnished for the jaws 8 without, however, materially affecting the strength of the gripping assembly. As illustrated, the jaws 8 of each chuck element are preferably four in number and each extends throughout an arc of 90°. The number of openings 12 is also preferably limited to four for each of the gripping elements. As shown especially in Fig. 4 the space defined between the series of serrations or teeth 11 is adequate to receive the body of a wire or cable 13 when the jaws 8 are not constricted or pressed towards each other. When so constricted by the interposed spring 14, the diameter of the space will be reduced to cause the serrations or teeth 11 to intimately engage with the exterior of the cable or wire 13.

As will be apparent, the gripping elements embrace the jaws and base portions which will, according to the present design, be in the form of a single and preferably integral unit. The jaws pivot by swinging with respect to their base portions 10 which are relatively flexible to allow of this action. As will additionally be apparent, when a cable or wire 13 is placed in operative association with one of the gripping assemblies, it should not be inserted into the body 5 to an extent such that it will actually project through the space defined by the spring 14. If so extended, there would exist the possibility of interference with the action of the spring. Also, the inner end of the wire or cable might actually extend to a point at which it might engage and interfere with the action of the second gripping assembly.

Now, with a view to properly strengthening and supporting each of the gripping assemblies as well as to provide a stop which confines the inner ends of each of the cables or wires to one of these assemblies, partition members are employed. These partition members may be in the form of discs 15. The extreme inner end of the base portions 10 are reduced to provide shoulders 16. The diameter of the discs 15 is such that they may be introduced into the base portions to a point where they rest against the shoulders 16. Thereafter, the edges of the base portions are peened over as indicated at 17. This will result in the discs or partitions 15 being retained against movement with respect to the assembly with which they are associated.

Therefore, it is apparent, that these transversely extending partitions will materially strengthen the base portions 10. This will prevent the latter from becoming distorted. Also, the partitions close the inner ends of these base portions. Accordingly, they function as stops to arrest inward penetration of the wires or cables. Therefore, the inner cable ends will not accidentally be extended to points beyond the inner ends of the chuck or gripping elements.

In employing a connector of this nature, it is apparent that all that an operator will have to do is to insert the inner end of one cable or wire section through the opening defined by one of the outer ends of the body 5. Thereupon, by bringing pressure to bear, he will cause the inner wire end to bear against the outer edges of the jaws 8 to effect a retraction of the adjacent gripping assembly. During this operation of the parts, it will be understood, that the inner end of the cable will be guided in that the outer ends of the jaws preferably define a tapered lip 18 which provides a guide surface assuring a diverting of the wire end to the bore existing between the jaws. With a retraction of the gripping element, the latter reaches a position within the bore of body 5 at which the jaws are no longer maintained in constricted positions.

Consequently, these jaws will move in outwardly radial directions to enlarge the space define between them. As will be understood, they will also be forced in such directions incident to the insertion of the wire into the space between the serrations 11 of the different jaws. With the wire end received between these jaws to a sufficient extent, it will be found that a proper coaction of the parts occurs.

If an operator tends to insert the wire to too great an extent, the only effect this will have will be, as shown in Fig. 3, of causing the wire end to engage the partition or stop 15. Beyond this, the wire cannot move inwardly with respect to the gripping assembly. When now, a second wire is associated in the same manner with the second gripping assembly of the connector, the splice will have been completed. It will be found that the spring 14 will have projected the gripping assemblies towards the outer ends of the body as soon as the compressive strain exerted by coupling the wire is released. Incident to such projection, a camming action will have occurred between the outer faces of the jaws of each gripping assembly and the tapered portions 6 of the body 5. This action will cause the serrations or teeth 11 to, in effect bite into the outer face of the wire. Therefore, the parts are rendered immovable with respect to each other. Also, as will be appreciated, the greater the strain in outward and opposite directions by the wires, the more this gripping action will be enhanced. Accordingly, there need be no fear that an accidental separation of the connector and wires will occur.

When it is desired to deliberately uncouple these parts, this may readily be achieved by inserting a proper implement through one of the openings 19 in the body 5. Prior to this, the adjacent gripping element should be retracted. The implement may thereupon be projected to enter one of the openings 12. Accordingly, the chuck assembly will be retained in retracted position. Under such conditions, the jaws 8 will separate. Therefore, the wire retained between them may be freely removed. After this has occurred, the implement may be withdrawn which will allow the gripping assembly to be projected under the action of the spring 14. However, too great a projection cannot occur incident to the stop provided by the relatively reduced end portions 7 of the body 5.

Thus, among others, the several objects of the invention as specifically afore noted are achieved. Obviously numerous changes in construction and rearrangement of the parts might be resorted to without departing from the spirit of the invention as defined by the claims.

What I claim is:

1. In a connector, a tapered casing, a wire gripping assembly in said casing spring biased within said casing, a cylindrical, radially rigid wall in said wire gripping assembly, a plurality of radially movable jaws separated by slots between their respective longitudinal edges mutually fixed on and integral with said radially rigid wall, a disc immovably fixed on said wall, said cylindrical wall and said fixed disc providing an anchor support for said radially movable jaws whereby the spring bias of said assembly against said tapered casing flexes said jaw elements radially in their fixed positions on said rigid wall.

2. In a connector having a tapered casing and a radial orifice at the end of the casing together with a wire gripping assembly spring biased axially within said casing including a plurality of radially movable jaws tapering in radial width along their axial length and teeth on the inner surface of each of said jaws spaced radially from each other, the combination of a rigid base portion integral with said jaws, inner ends of said jaws flexibly fixed on said integral rigid base portion so that said jaw portions hinge radially on said base portion and outer ends of said jaws radially movable with relation to said radially rigid base flexing inward under said spring bias against said tapered casing so as to pivot said tapered jaws radially on said flexibly fixed inner ends thereby constricting the radial spacing between the jaw teeth equally along their axial length whereby a firm engageability of all said teeth against a wire inserted through said radial orifice is provided.

STEPHEN P. BECKER.

REFERENCES CITED

The following references are of record in the file of this patent:

UNITED STATES PATENTS

| Number | Name | Date |
|---|---|---|
| 1,854,783 | Cook | Apr. 19, 1932 |
| 2,138,913 | Fotsch | Dec. 6, 1938 |
| 2,161,694 | Becker | June 6, 1939 |